UNITED STATES PATENT OFFICE.

JOKICHI TAKAMINE, OF NEW YORK, N. Y.

PROCESS FOR PRODUCING DIASTATIC PRODUCT.

1,054,324. Specification of Letters Patent. Patented Feb. 25, 1913.

No Drawing. Application filed March 10, 1910. Serial No. 548,403.

*To all whom it may concern:*

Be it known that I, JOKICHI TAKAMINE, a subject of the Emperor of Japan, and a resident of New York city, borough of Manhattan, in the county and State of New York, have invented a new and useful Process for Producing Diastatic Product, of which the following is a specification.

In the production of koji and moyashi as described in my Letters Patent of the United States numbered 525820, 525822 and 525823, and in my application No. 541617, filed February 2, 1910, the spores are sowed on the surface of the culture medium such as wheat bran moistened with water. Heretofore, it was supposed that quietude was essential to efficient growth because it was supposed that the superficially sowed spores would be displaced by movement of the culture medium. I have discovered, however, that a certain amount of motion is not only permissible but very advantageous, since it not only does not interfere with the growth, but actually accelerates it and enables large economies to be had in the operation. I have also discovered that when produced in motion, the mycelial growth is different, the filaments being shorter and thicker and the number of branches being greatly increased, thereby increasing the number of ends for heading out in moyashi spores. Before my present invention, it was the custom to spread the culture medium loosely to a thickness of not exceeding three to four inches, thereby giving the air access to as large a surface as practicable. This not only required an enormous floor space, but made unavoidable the infection of the mass by foreign fungi and bacteria settling down upon it from the air. The labor and expense of installing and operating the apparatus in consequence of the trays on which the culture medium was spread, were also items in which improvement was urgent. By the use of my present invention, the mass may be several feet in thickness—say three or four feet—or even more, while in the old process a thickness of three or four inches was the maximum, and even at that thickness the growth of the fungus was not as satisfactory as that carried on with a thickness of one to two inches.

In practising my present invention, the mass is agitated continually so that the particles of the mass will be brought to the surface in succession in order to have access to the air. This agitation, however, is not of such violence as to substantially impede the fungus growth though it modifies the character of the mycelial filaments thereof. The agitation is such as to cause the particles to go through a cycle of movement not to exceed about once or twice per minute, by preference, and although this speed of agitation may be increased considerably, I have found that when it reached ten cycles per minute, the growth was materially impeded.

Although I do not wish to be understood as limiting myself to the machinery employed for agitation. I, nevertheless, prefer to employ a pneumatic malting drum within which the mass is tumbled by a rotation of preferably once or twice per minute, while subjected to a current of moistened air in order to supply the air required for growth and remove the gases as fast as formed.

*Example of the process for making koji.—* Sufficient culture medium is introduced into the drum to produce a depth of about three or four feet. This culture medium preferably consists of wheat bran moistened so as to contain from 60 to 80 parts of water or less by weight to 100 of bran. The culture medium is then sterilized by steaming for an hour or less. The rotation of the drum is then started and a current of air so as to cool the mass. When cooled to about 30° C., the drum and current are stopped and the moyashi spores of my application Serial No. 541617 are added to the mass in the proportions of about one part of sifted moyashi spores to 1500 parts of dry bran, or one part of unsifted moyashi spores to 200 parts of dry bran. The drum is then rotated sufficiently to thoroughly mix the spores and culture medium and is then stopped and is allowed to remain at rest with the temperature of the mass kept at about 30° C. for from 16 to 20 hours when the mass will begin to heat by itself owing to the germination of fungus spores. The rotation of the drum is then resumed and the current of air started; the current being adjusted to increase as the temperature of the mass tends to increase. Sometimes 40 to 42° C. is reached but by a steady increase of the air current and maintaining it cold and humid, the temperature of the mass can be kept down near to the optimum point of the fungus growth which lies near 30° C. A temperature of from 35 to 38° C. does not materially affect the quality of the final product, nor the time of completing the process and it is preferred to keep the mass at about this temperature since any effort to maintain the temperature nearer to 30° C. may frequently result in accidentally going below that temperature and thereby impeding the growth of the fungus. After about 40 to 50 hours of subjection to this rotation and current of air, the whole mass will be permeated with a growth of fungi which, on the surface, does not show such a silky luster as is found by growing the fungi on the culture medium at rest; but, on the contrary, shows shorter and thicker filaments and a much greater number of branches. The process is then complete and the mass of koji produced may be either dried in the drum or after removal therefrom. It is exceedingly uniform in its diastatic power and is decidedly stronger than that produced by growing the fungi on the material at rest. The chances of contaminating the mass by bacteria or foreign fungi is reduced to a minimum because the preliminary steaming may be carried on inside the drum and the air constituting the current therethrough may be purified by known methods. In case the acclimatized moyashi spores described in my application No. 541617, filed February 2, 1910, are employed, the contamination of the mass may be still further provided against by introducing formaldehyde either as a gas or a spray into the mass within the drum in case at any stage of the process the development of bacteria or foreign fungus is discovered.

Koji and moyashi are distinguished as follows: When the mycelial growth of the fungus has reached the stage prior to heading out into sporophore (or spore bearer) it has a white silky appearance and the product of that stage is koji. Moyashi is the product of a later stage when the mycelial growth has headed out into spores giving a yellowish appearance.

Having thus described my invention, what I claim is:

1. The process of manufacturing diastatic product which consists in sowing diastatic spores upon a culture medium and subjecting the same to incubating conditions combined with normally continuous agitation.

2. The process of manufacturing diastatic product which consists in sowing acclimatized diastatic spores upon a culture medium and subjecting the same to incubating conditions combined with antiseptic conditions and agitation.

3. The process of manufacturing diastatic product which consists in sowing diastatic spores upon a culture medium and subjecting the same to incubating conditions combined with tumbling.

4. The process of manufacturing diastatic product which consists in sowing diastatic spores upon a culture medium and subjecting the same to incubating conditions while securing air contact by keeping the mass normally in agitation.

In testimony whereof, I have hereunto signed my name in the presence of two subscribing witnesses.

JOKICHI TAKAMINE.

Witnesses:
KEIZO WOOYENAKA,
JOKICHI FUKUI.